T. RIOS.
TORTILLA FORMING MACHINE.
APPLICATION FILED AUG. 2, 1915.

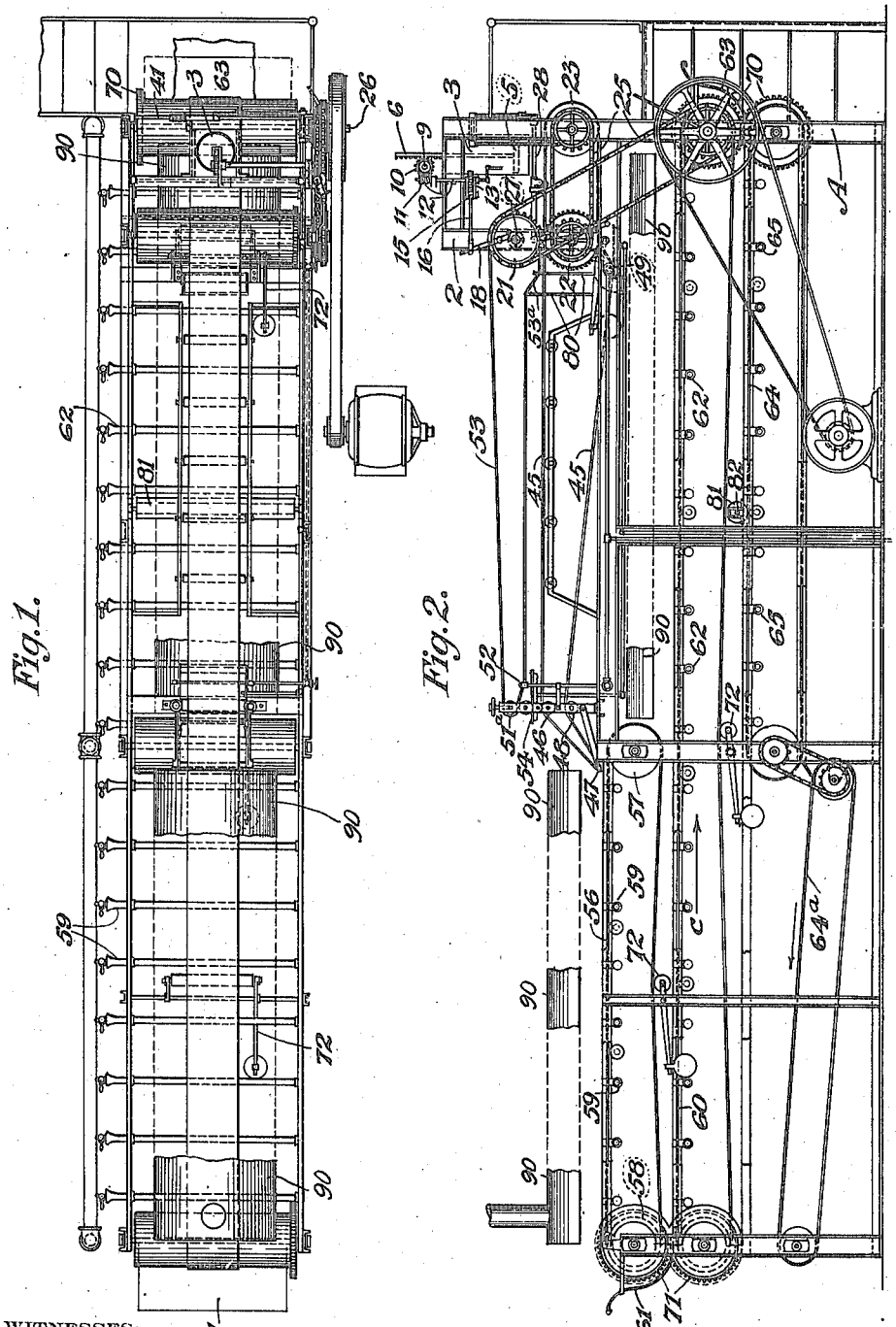

1,263,929.

Patented Apr. 23, 1918.
5 SHEETS—SHEET 2.

Fig. 3.

WITNESSES:
L. J. Forde.
B. M. Doolin

INVENTOR
Thomas Rios.
BY Strong and Townsend
ATTORNEYS

T. RIOS.
TORTILLA FORMING MACHINE.
APPLICATION FILED AUG. 2, 1915.

1,263,929.

Patented Apr. 23, 1918.
5 SHEETS—SHEET 3.

WITNESSES:
L. J. Forde.
B. M. Doolin.

INVENTOR
Thomas Rios.
BY Strong and Townsend
ATTORNEYS

T. RIOS.
TORTILLA FORMING MACHINE.
APPLICATION FILED AUG. 2, 1915.

1,263,929.

Patented Apr. 23, 1918.
5 SHEETS—SHEET 4.

WITNESSES:
L. J. Forde
B. M. Doolin

INVENTOR
Thomas Rios.
BY Strong and Townsend
ATTORNEYS

T. RIOS.
TORTILLA FORMING MACHINE.
APPLICATION FILED AUG. 2, 1915.

1,263,929.

Patented Apr. 23, 1918.
5 SHEETS—SHEET 5.

WITNESSES:
L. J. Forde
B. M. Doolin

INVENTOR
Thomas Rios
BY Strong and Townsend
ATTORNEYS

UNITED STATES PATENT OFFICE.

THOMAS RIOS, OF SAN FRANCISCO, CALIFORNIA, ASSIGNOR OF ONE-HALF TO D. F. BERNAL, OF LIVERMORE, CALIFORNIA.

TORTILLA-FORMING MACHINE.

1,263,929.    Specification of Letters Patent.    Patented Apr. 23, 1918.

Application filed August 2, 1915. Serial No. 43,059.

*To all whom it may concern:*

Be it known that I, THOMAS RIOS, a citizen of Mexico, residing in the city and county of San Francisco and State of California, have invented new and useful Improvements in Tortilla-Forming Machines, of which the following is a specification.

This invention relates to a tortilla forming and baking machine; and one of the objects of the invention is to construct a simple, substantial, automatically operated machine provided with means, first, for delivering measured quantities of dough, second, with means for rolling and forming the dough into cakes of equal thickness, and, third, to provide means for turning and baking the cakes in such a manner as to retain the full corn flavor and improve the general quality of the product. Further objects will hereinafter appear.

The invention consists of the parts and the construction and combination of parts as hereinafter more fully described and claimed, having reference to the accompanying drawings, in which—

Figure 1 is a plan view of the machine with parts broken away.

Fig. 2 is a side elevation with parts broken away.

Fig. 3 is an enlarged side elevation of the feeding end of the machine, partly broken away.

Figure 4:
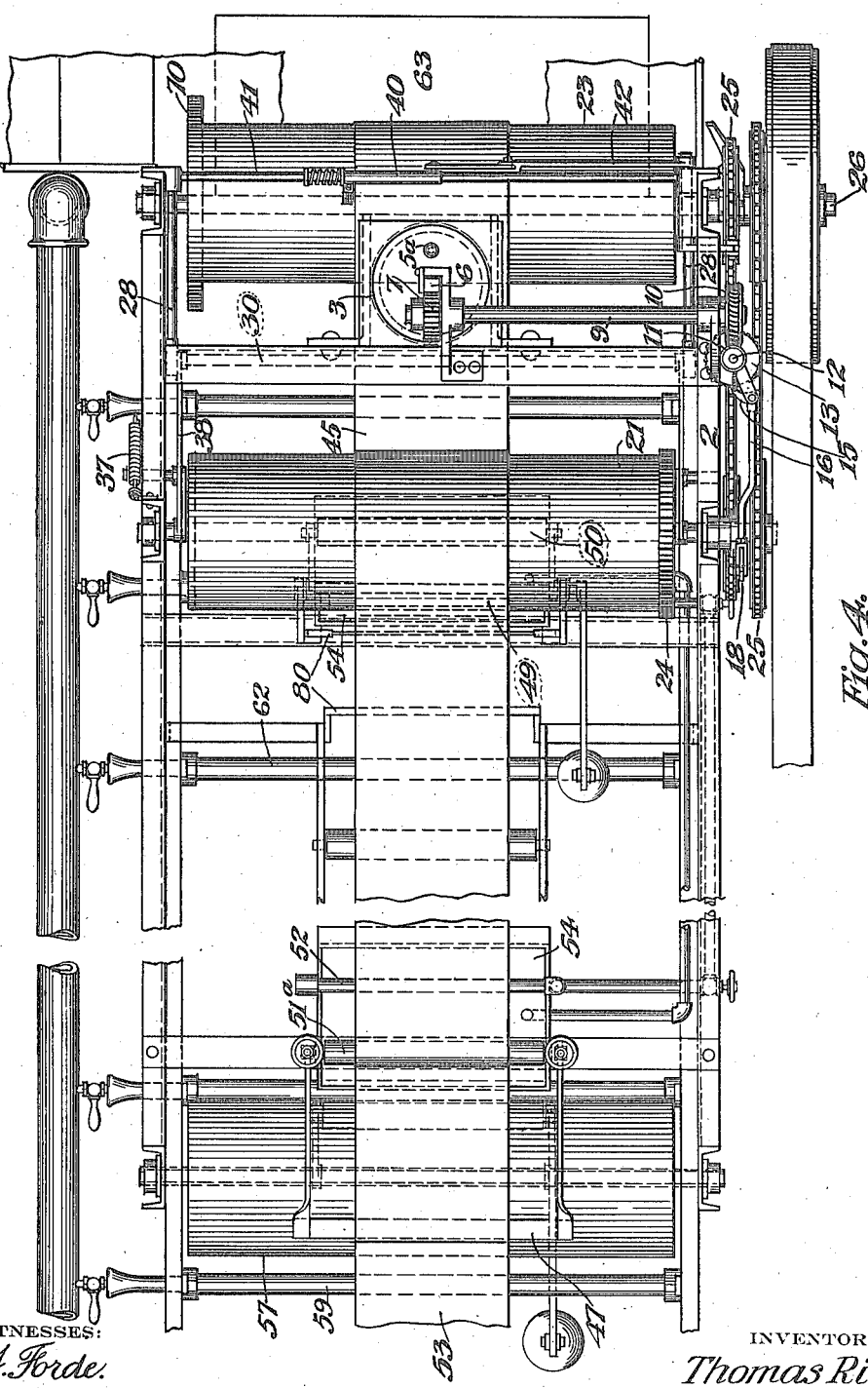
Fig. 4 is a plan view of Fig. 3.

In the accompanying drawings, a machine is shown which is provided with means for automatically feeding the dough from which tortillas are made. Means are also provided for slicing the dough to form the cake and for rolling or pressing the cake to the desired thickness and finally baking it before it is discharged from the machine. This is accomplished in the following manner: A indicates a main frame, on one end of which is mounted a super-frame 2. Suitably secured in the super-frame is a cylinder 3 which is adapted to receive the dough. This cylinder is open at both ends, but the lower end is provided with an inwardly turned flange 4 (see Fig. 6) which is provided for the purpose of holding the dough or preventing it from dropping out too freely. For forcing the dough out of the lower discharge end of the cylinder in predetermined quantities a piston 5 has been provided.

In order to move the piston in a downward direction to force the dough out of the discharge end of the cylinder in predetermined quantities, it is necessary to transmit an intermittent movement to the piston. This is accomplished as follows: Secured on the piston is a rack bar 6 which is so positioned as to engage with a gear 7, mounted in a bracket 8 on the upper end of the superframe 2. Secured on the outer end of shaft 9, which carries the gear 7, is a worm wheel 10, and intermeshing with said worm wheel to turn the shaft and gear 7 is a worm gear 11 which is secured on a vertically disposed shaft 12 journaled on one side of the superframe. Secured on the lower end of shaft 12 is a ratchet gear 13, and turnable on the shaft and straddling the gear 13 is a fork-shaped lever 14, in which is pivotally mounted a pawl 15. The fork-shaped lever is oscillated by means of a link 16 which is connected to the upper end of a rocker arm 18 pivotally mounted, as at 20, on the side of the super-frame.

Journaled in the super-frame are three drums 21, 22 and 23 which are driven in unison by means of the connected gear trains 24 and sprocket chains 25, which in turn are driven from a main power shaft 26. Secured on one end of drum 21 is a plurality of pins 27 which are so positioned as to engage the lower end of lever 18. Revolving movement of drum 21 will cause the pins 27 to rock lever 18 and connected link 16, causing the pawl 15 to engage the ratchet gear and rotate the shafts 12 and 9. This will cause the rack bar and connected piston to move in a downward direction at intermittent intervals. The dough contained within the cylinder is forced through the lower discharge end of the cylinder and is here sliced off by the reciprocating cutter which is constructed as follows: Mounted on each side of the dough receiving hopper, or directly inside of the main channel beams of frame A, (see Figs. 5 and 6) is a pair of guide rods 28, and slidably mounted on said rods is a carriage which consists of a pair of sliding blocks 29 connected by means of a rod 30. This rod is pivotally mounted in the sliding blocks and the central section of the rod is provided with two upwardly extending lugs 31, between which is strung a wire 32, the tension of which may be adjusted by means of a screw 33.

Figures 5, 6:
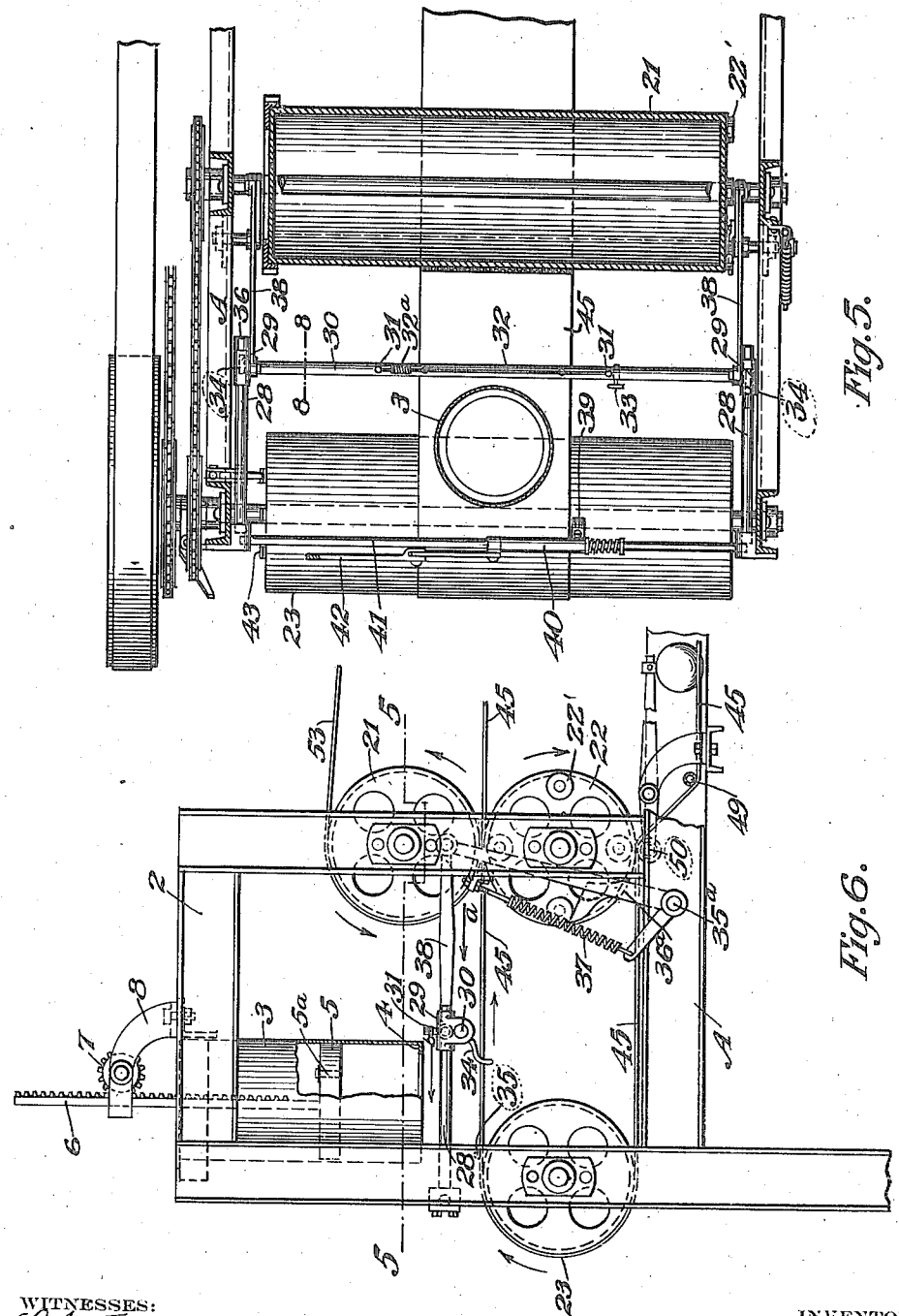
Fig. 5 is a section on line 5—5, Fig. 6.
Fig. 6 is a side elevation of the dough slicing knife and connected operating mechanism.
Figure 7:
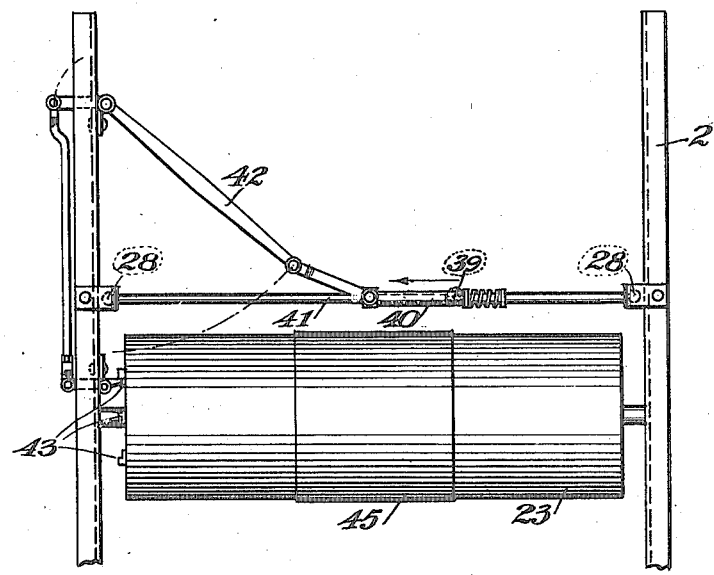
Fig. 7 is an enlarged end view of the knife wiping mechanism.
Figure 8:
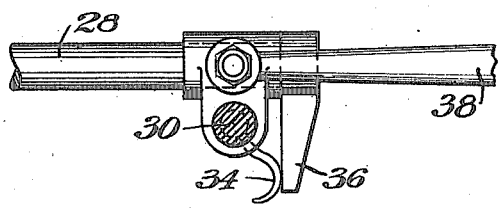
Fig. 8 is an enlarged section on line 8—8, Fig. 5.

Secured at each end of the rod is a downwardly projecting finger 34 one of which is engageable with a stop 35, at one end of the stroke, and the other finger 34 with a stop 36 at the other end. The finger which engages the forward stop 35 has its free terminal curved, as shown in Fig. 6, to ride downwardly on said stop and effect a partial rotation of the rod 30 to swing or depress the lugs 31 with their cutting wire for permitting of the cutter passing freely beneath the hopper on its return stroke. The finger arranged to engage stop 36 is oppositely curved, as depicted in Fig. 8, to ride downwardly thereon and return the cutter to upright position ready for another slicing operation. Secured on one end of the drum 22 is a plurality of outwardly projecting pins 22', and journaled crosswise of the frame, below the drum 22, is a shaft 35$^a$, on each end of which is secured a bell crank 36$^a$. One end of each bell crank extends upwardly in a position where the revolving movement of drum 22 will bring the pins into engagement with the lower ends of the bell cranks 36$^a$, thus moving the crank arms in the direction of arrow $a$ (see Fig. 6). The other end of each bell crank is connected with a coil spring 37 which moves the bell cranks back into engagement with the pins on the drum 22. The bell cranks are thus constantly rocked while the drum is rotating. This rocking movement is transmitted through links 38, the inner ends of which are connected, one to each sliding block 29. The reciprocating movement is in this manner transmitted to the sliding blocks 29, with connected rod 30 and wire cutter 32, causing the wire to pass directly under the discharge end of the cylinder and slice off the dough as it is being forced out by the action of piston 5.

The lugs 31, on rod 30, upon which the wire cutter is secured assumes the vertical position indicated in Fig. 6 when it is moved in the direction of arrow $b$; the wire slicing off the dough when moving in this direction. The wire or cutter will then be depressed, as above set forth, for moving back, this being necessary to clear the dough which is being discharged or pressed out of the hopper.

For the purpose of cleaning the wire or cutter 32, after each reciprocation, a wiper, indicated at 39, has been provided. This wiper consists of a plurality of layers of felt or like material which is secured to a carriage 40, mounted upon the rod 41 disposed transversely of the frame 2. This carriage is reciprocated every time the wire cutter has moved beneath the cylinder in the direction of arrow $b$, and this reciprocating movement is transmitted through a bell crank 42 which is rocked by means of pins 43 mounted on drum 23. The position of the pins 43 is such that the bell crank 42, with connected carriage 40, is reciprocated just at the moment that the wire cutter reaches the end of its forward slicing stroke. The wire cutter is in this manner kept clean and any accumulation or hardening of the dough on the cutter is eliminated.

Mounted below the hopper 3 and the cutter 32 is a conveyer belt 45 which moves in the direction of the arrow. This belt is provided for the purpose of removing the sliced sections of dough and also for conveying the sliced sections to a point where they may be rolled or flattened out to the desired thickness before they are deposited upon the baking belts hereinafter to be described. This is accomplished as follows: The conveyer belt 45 is preferably constructed of a light fabric, such as linen cloth or like material, and is driven by means of the drum 23. The opposite end of the belt passes over a roller 46, a guide rod 47 and a roller 48. It then passes under a spray pipe, indicated at 49, and a squeezing roller 50. A second belt 53 of similar construction passing over and driven by drum 21 has its opposite end passing over a roller 51. It then passes under a spray pipe 52, similar to spray pipe 49. These spray pipes are provided for forcing water through the interstices of the fabric to remove any flour or dough which might otherwise accumulate. Any superfluous amount of water left in belt 53 is removed by a squeezing roller 51$^a$ and any superfluous amount of water left in belt 45 is removed by the squeezing roller 50; the water thus removed being collected by pans, such as indicated at 54. The conveyer belt 45 and belt 53 are thus automatically cleaned as they pass over their adjacent drums and guide rollers and all accumulations which might have a tendency to collect are constantly removed. The degree of compression of squeeze roller 50 is controlled by the weighted lever 50' while roller 51$^a$ is adjustable toward or from roller 51 by the screw 51' disclosed in Fig. 3.

The sliced sections of dough delivered to the belt 45 will not only be handled in a sanitary way but will also be prevented from sticking to the belts, as the belts are always clean and supplied with sufficient moisture to prevent adhesion. The drums 21 and 22, over and between which the belts 45 and 53 pass, are provided for rolling out the dough, or, in other words, pressing it to the desired thickness. The dough cakes, after being rolled out by the drums 21 and 22, are carried by the belt 45 to the roller 46 where they are permitted to slide down over the guide rod 47 to a point where they are deposited upon an endless flexible metallic conveying belt 56. This belt is carried by rollers 57 and 58, and the belt is continuously heated by means of a plurality of gas burners, such as indicated at 59.

The cakes deposited on the belt will be baked on one side and will then be automatically discharged and turned before they are delivered to a second endless flexible metallic conveyer, indicated at 60. The turning of the cakes, when being transferred from one belt to the other, is accomplished by means of a turning plate 61. The cakes delivered to belt 60 are then conveyed in the direction of arrow c over a plurality of burners 62 and one side of the cake is here completely baked. The cakes are then discharged at the opposite end and again turned by a plate 63 and finally delivered to a belt 64 which is heated by means of burners 65. The sides of the cakes which are first partly baked on the upper belt are here completely baked and the cakes are finally discharged at the opposite end of the belt and taken away from the machine in any suitable manner, or as here shown by a belt 64ª. Suitably arranged hoods 90 are provided above the belts for collecting and conducting away the gases and vapors.

The baking belts provided consist of connected sections of thin sheet iron, but may be constructed in any suitable manner. They are all driven in unison and at approximately the same speed from the main driving shaft by means of the gears, indicated at 70 and 71, and are supported at suitable intervals, intermediate of the driving pulleys, by means of belt tighteners 72 which not only serve to support the intermediate sections of belt but also automatically take up any slack, due to expansion, when the belts are heated by the several burners.

The dough from which tortillas are baked consists largely of corn-meal and contains a high percentage of water. The baking of the cakes presents more or less of a problem as the cakes are very brittle and must be cooked or baked in approximately the following manner: The cake delivered by the conveyer 45 to the first baking belt 56 is first slightly baked on one side. The cake is then delivered to the second belt which is approximately twice as long as the first belt. The cake is here subjected to baking action which completes the baking of one side of the cake and also cooks the interior of same. This is necessary in order to retain the corn flavor and also to prevent the cake from becoming tough. The steam generated inside of the cake thoroughly cooks it and the slight crust formed by the first operation prevents steam from escaping too freely and also prevents the aroma and flavor of the corn from escaping.

The cake is then delivered to the third and last belt 64 where the baking action is completed and the cake is finally permitted to discharge at the point indicated at 73 and delivered to a conveyer or like device, not here shown, which carries the product away from the machine. The baking operation just described is a mechanical imitation of the method employed by the natives and the product produced is, if anything, superior, as every cake is subjected to exactly the same treatment.

To prevent the dough from discharging too freely through the lower end of the hopper or cylinder 3 a valve 5ª has been provided in the piston 5. This valve permits the air to escape when the piston is forced down into contact with the dough body within the cylinder and automatically closes the moment the air has been dispelled. The main body of dough is retained by vacuum and cannot discharge faster than it is expelled by the piston.

The machine here shown is simple and compact in construction and positively automatic in operation. The only manual labor required in connection with its operation is the filling of the dough receiving hopper or cylinder 3 from time to time as the contents is completely discharged.

The materials and finish of the several parts of the machine are such as the judgment and experience of the manufacturer may dictate. I wish it understood that various changes in form, proportions and minor details of construction may be resorted to within the scope of the appended claims, and that I do not wish to limit myself to the specific design and construction here shown.

Figure 9:
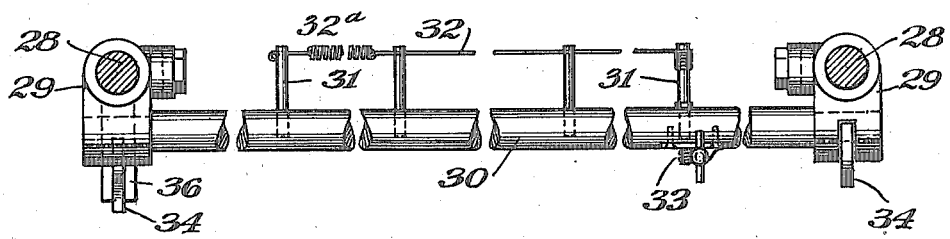
Fig. 9 is an enlarged end view of the knife.

Referring to the enlarged detail view of Fig. 9, it will be seen that a coil spring 32ª has been interposed between the two end supporting members 31 upon which the cutting wire 32 is mounted; the purpose of the spring 32ª being to automatically maintain a fixed tension on the cutting wire and also to prevent breaking or undue straining of same.

Referring to Figs. 2 and 3, it will be seen that the upper belt 53 is turned upwardly at a comparatively sharp angle, as indicated at 53ª; this being accomplished by providing a pair of guide members 80, under and over which the belt may pass. This comparatively sharp turn or upward rise in the belt is provided for the purpose of preventing any cakes adhering to the upper belt. The moment the belt passes under the first guide member 80 it takes such a sharp turn or upward rise that any cakes that might have a tendency to adhere to the belt are immediately peeled off or liberated as the belt turns.

In actual practice it has been found that the first baking operation of the individual cakes while passing over belts 56 and 60 causes a skin to form on the exterior of the cake. This skin prevents the steam generated within the cake from escaping, consequently causing the cake to swell or puff up to a considerable extent. For the purpose of removing the steam and again flattening out the cake, a weighted roller 81 has been provided. This roller is loosely mounted in guide brackets 82 directly over the lower belt 64. Every cake supported by the belt 64 and traveling with same is consequently forced under roller 81. As this is sufficiently heavy, it causes each succeeding cake to be flattened by forcing out the steam contained therein.

Having thus described my invention, what I claim and desire to secure by Letters Patent is—

1. In a baking machine, a dough receiving hopper, a plunger movable in the hopper to force the dough therefrom, superposed endless conveyers having parallel lengths between which the dough is adapted to travel, guide means for abruptly dividing the length of the upper conveyer and separating one division of the length from the lower conveyer, and means for washing the separated division of the specified length.

2. In a baking machine, a dough receiving hopper having a discharge opening formed in its lower end, a plunger movable in the hopper to force the dough through the discharge opening, means for moving the piston at timed intervals a predetermined distance to discharge a predetermined quantity of dough, a carriage slidably mounted below the hopper, means for reciprocating the carriage with relation to the discharge opening in the hopper, a frame tiltably mounted in the carriage, a knife comprising a wire secured in said frame, means for tilting the frame to move the wire into cutting position when the carriage moves in one direction under the discharge opening, means for tilting the frame in the opposite direction to lower the wire out of cutting position when the carriage moves in the opposite direction, and cleaning means operable in a defined path for wiping the wire after each cutting operation and prior to the operation of said wire lowering means.

3. In a baking machine, a dough receiving hopper having a discharge opening formed in its lower end, a plunger movable in the hopper to force the dough through the discharge opening, means for moving the piston at timed intervals a predetermined distance to discharge a predetermined quantity of dough, a carriage slidably mounted below the hopper, means for reciprocating the carriage with relation to the discharge opening in the hopper, a frame freely tiltable on the carriage, a knife comprising a wire secured in said frame, means for tilting the frame to move the wire into cutting position when the carriage moves in one direction under the discharge opening, means for tilting the frame in the opposite direction to lower the wire out of cutting position when the carriage moves in the opposite direction.

4. In a baking machine, a dough receiving hopper having a discharge opening formed in its lower end, a plunger movable in the hopper to force the dough through the discharge opening, means for moving the piston at timed intervals a predetermined distance to discharge a predetermined quantity of dough, a carriage slidably mounted below the hopper, means for reciprocating the carriage with relation to the discharge opening in the hopper, a frame freely and tiltably mounted in the carriage, a knife comprising a wire secured in said frame, means normally free of the frame for tilting the frame to move the wire into cutting position when the carriage moves in one direction under the discharge opening, means normally free of the frame for tilting the frame in the opposite direction to lower the wire out of cutting position when the carriage moves in the opposite direction.

5. In a baking machine, a dough receiving hopper having a discharge opening formed in its lower end, a plunger movable in the hopper to force the dough through the discharge opening, means for moving the piston at timed intervals a predetermined distance to discharge a predetermined quantity of dough, a carriage slidably mounted below the hopper, means for reciprocating the carriage with relation to the discharge opening in the hopper, a frame tiltably mounted in the carriage, and a knife comprising a single length of wire secured in said frame and including a spring portion.

6. In a baking machine, a dough receiving hopper having a discharge opening formed in its lower end, a plunger movable in the hopper to force the dough through the discharge opening, means for moving the piston at timed intervals a predetermined distance to discharge a predetermined quantity of dough, a carriage slidably mounted below the hopper, means for reciprocating the carriage with relation to the discharge opening in the hopper, a frame tiltably mounted in the carriage, a knife comprising a yieldable wire secured in said frame, means normally spaced from the frame for tilting the frame to move the wire into cutting position when the carriage moves in one direction under the discharge opening, and other means normally spaced from the frame for tilting the frame in the opposite direction to lower the wire out of cutting position when the carriage moves in the opposite direction.

7. In a baking machine, the combination with a dough containing hopper having a discharge opening formed therein, and means for forcing the dough therethrough, of a carriage reciprocally mounted below the discharge opening, a rod pivotally mounted in the carriage, a pair of upwardly extending lugs on said rod, a single length of wire including a resilient portion between its ends strung over and secured in said lugs, said wire adapted to slice off the dough discharging from the hopper, and means for reciprocating the carriage.

8. In a baking machine, the combination with a dough containing hopper having a discharge opening formed therein and means for forcing the dough therethrough, of a carriage reciprocally mounted below the discharge opening, a rod pivotally mounted in the carriage, a pair of upwardly extending lugs on said rod, a wire strung over and secured in said lugs, said wire adapted to slice off the dough discharging from the hopper, a pair of trip fingers secured on the pivotally mounted rod, a stop member arranged at each limit of movement of the carriage, one finger being engageable with a stop at one reciprocation of the carriage and the other finger being engageable with the other stop on the succeeding reciprocation of the carriage to turn the rod and wire into and out of slicing position, and means for reciprocating the carriage.

9. In a baking machine, the combination with a dough containing hopper having a discharge opening formed therein and means for forcing the dough therethrough, of a carriage reciprocally mounted below the discharge opening, a rod pivotally mounted in the carriage, a pair of upwardly extending lugs on said rod, a wire strung over and secured in said lugs, said wire adapted to slice off the dough discharging from the hopper, a pair of angularly related trip fingers secured on the pivotally mounted rod, a pair of stop members with which said fingers are engageable at each complete reciprocation of the carriage to turn the rod and wire into and out of slicing position, means for reciprocating the carriage, and means for wiping off the wire after each slicing operation.

10. In a baking machine, the combination with a dough containing hopper having a discharge opening formed therein and means for forcing the dough therethrough, of a carriage reciprocally mounted below the discharge opening, a rod pivotally mounted in the carriage, a pair of upwardly extending lugs on said rod, a wire including an integral coiled spring portion between its ends strung over and secured in said lugs, said wire adapted to slice off the dough discharging from the hopper, and means for reciprocating the carriage.

11. In a baking machine, the combination with a dough containing hopper having a discharge opening formed therein and means for forcing the dough therethrough, of a carriage reciprocally mounted below the discharge opening, a rod pivotally mounted in the carriage, a pair of upwardly extending lugs on said rod, a wire including a resilient portion strung over and secured in said lugs, said wire adapted to slice off the dough discharging from the hopper, and means for varying the tension of the wire and its resilient portion.

12. In a baking machine, the combination with a dough containing hopper having a discharge opening formed therein and means for forcing the dough therethrough, of a carriage reciprocally mounted below the discharge opening, a rod pivotally mounted in the carriage, a pair of upwardly extending lugs on said rod, a wire strung over and secured in said lugs, said wire adapted to slice off the dough discharging from the hopper, a pair of oppositely curved trip fingers secured on the pivotally mounted rod, a pair of stop members with which said fingers are engageable at each complete reciprocation of the carriage to turn the rod and wire into and out of slicing position, and means for reciprocating the carriage.

13. In a baking machine, a dough slicing device comprising a frame, a carriage slidably mounted in the frame, a rod turnably mounted in the carriage, a pair of lugs on the rod, a cutting or slicing wire strung over and secured on the lugs, finger means secured on the rod, and a pair of stop members in the frame engageable with the finger means at each limit of movement of the carriage to turn the rod and wire into and out of slicing position.

14. In a baking machine, a dough slicing device comprising a frame, a carriage slidably mounted in the frame, a rod mounted in the carriage, a pair of lugs on the rod, and a cutting wire including in its length a yieldable portion stretched between and secured on the lugs.

15. In a baking machine, the combination with a dough containing hopper having a discharge opening formed therein, and means for forcing the dough therethrough, of a carriage reciprocally mounted below the discharge opening, a rod pivotally mounted in the carriage, a pair of upwardly extending lugs on said rod, a wire strung over and secured in said lugs, said wire adapted to slice off the dough discharging from the hopper, a flexible section formed integral in said wire between its ends, a trip finger secured on the pivotally mounted rod, a pair of stop members with which said finger is engageable at each reciprocation of the carriage to turn the rod and wire into and out of slicing position, and means for reciprocating the carriage.

16. In a baking machine, the combination with a dough containing hopper having a discharge opening formed therein, and means for forcing the dough therethrough, of a carriage reciprocally mounted below the discharge opening, a rod pivotally mounted in the carriage, a pair of upwardly extending lugs on said rod, a wire strung over and secured in said lugs, said wire adapted to slice off the dough discharging from the hopper, a coil spring interposed between the ends of said wire, and formed integral therewith, a trip finger secured on the pivotally mounted rod, a pair of stop members with which said finger is engageable at each reciprocation of the carriage to turn the rod and wire into and out of slicing position, and means for reciprocating the carriage.

17. In a baking machine, a dough receiving hopper, a plunger movable in the hopper to force the dough therefrom, superposed endless conveyers having coöperating lengths between which the dough is adapted to travel, and guide means for abruptly separating the lower length of the upper conveyer from the upper length of the lower conveyer and for dividing the length of said upper conveyer whereby the latter will continue to move in the same direction over the upper length of the lower conveyer.

18. In a baking machine, dough feeding means, a reciprocatory cutter for severing the dough from said means, a reciprocatory wiper mounted for movement transverse to that of the cutter and arranged at one limit of travel thereof to be engaged by the cutter upon reciprocation of the latter toward said limit of travel, and means for reciprocating the wiper when engaged by the cutter to clean the latter.

19. In a baking machine, a hopper, a pair of guide rods therebelow, a carriage reciprocable on the rods and including a pivotal rod, spaced lugs carried by the pivotal rod, a cutting wire supported by the lugs, a transversely arranged wiper support disposed in advance of the carriage, a wiper slidable on the wiper support and adapted to be engaged by the cutting wire on the completion of its operative stroke, and means for sliding the wiper when engaged by the wire.

20. In a baking machine, a hopper, a pair of guide rods therebelow, a carriage reciprocable on the rods and including a pivotal rod, spaced lugs carried by the pivotal rod, a cutting wire supported by the lugs, stops carried by the opposite ends of said pair of guide rods, and curved fingers carried by the pivotal rod and adapted to engage the stops to rock the pivotal rod and its supported cutting wire, one of said fingers operating at one limit of a reciprocation of the carriage and the other finger operating at the opposite limit of movement of the carriage.

In testimony whereof I have hereunto set my hand in the presence of two subscribing witnesses.

THOMAS RIOS.

Witnesses:
W. W. HEALEY,
M. E. EWING.